United States Patent
Okamoto

(10) Patent No.: US 10,871,465 B2
(45) Date of Patent: Dec. 22, 2020

(54) GAS SENSOR

(71) Applicant: NGK INSULATORS, LTD., Nagoya (JP)

(72) Inventor: Taku Okamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 21 days.

(21) Appl. No.: 16/297,958

(22) Filed: Mar. 11, 2019

(65) Prior Publication Data

US 2019/0277795 A1  Sep. 12, 2019

(30) Foreign Application Priority Data

Mar. 12, 2018 (JP) .................. 2018-043919

(51) Int. Cl.
G01N 27/407 (2006.01)

(52) U.S. Cl.
CPC ..... G01N 27/4071 (2013.01); G01N 27/4075 (2013.01); G01N 27/4077 (2013.01)

(58) Field of Classification Search
CPC ................................................. G01N 27/4075
See application file for complete search history.

(56) References Cited

U.S. PATENT DOCUMENTS

| | | | |
|---|---|---|---|
| 2004/0069629 A1* | 4/2004 | Tanaka | G01N 27/419 204/424 |
| 2009/0229978 A1* | 9/2009 | Mizutani | G01N 27/407 204/424 |
| 2016/0033447 A1 | 2/2016 | Nakasone et al. | |

FOREIGN PATENT DOCUMENTS

| | | | |
|---|---|---|---|
| DE | 4408504 A1 * | 9/1995 | .......... G01N 27/407 |
| JP | 2016-033510 A | 3/2016 | |
| JP | 2017-116371 A | 6/2017 | |

OTHER PUBLICATIONS

EPO machine-generated English langauge translation of the Description section DE 4408504 A1 (Year: 1995).*

* cited by examiner

*Primary Examiner* — Alexander S Noguerola
(74) *Attorney, Agent, or Firm* — Mattingly & Malur, PC

(57) ABSTRACT

A mixed-potential gas sensor includes: a first sensing electrode containing a Pt—Au alloy and a second sensing electrode containing Pt, the first and second sensing electrodes being provided on a surface of a sensor element made of an oxygen-ion conductive solid electrolyte on one leading end part side; a reference electrode provided inside the sensor element to be made contact with air; a protective cover that surrounds the one leading end part of the sensor element and into which measurement gas flows; and concentration identification element configured to identify a concentration of a sensing target gas component based on potential differences between both of the first sensing electrode and the second sensing electrode and the reference electrode. The first and second sensing electrodes are disposed so that the measurement gas flowing into the protective cover reaches the first sensing electrode earlier than the second sensing electrode.

6 Claims, 11 Drawing Sheets

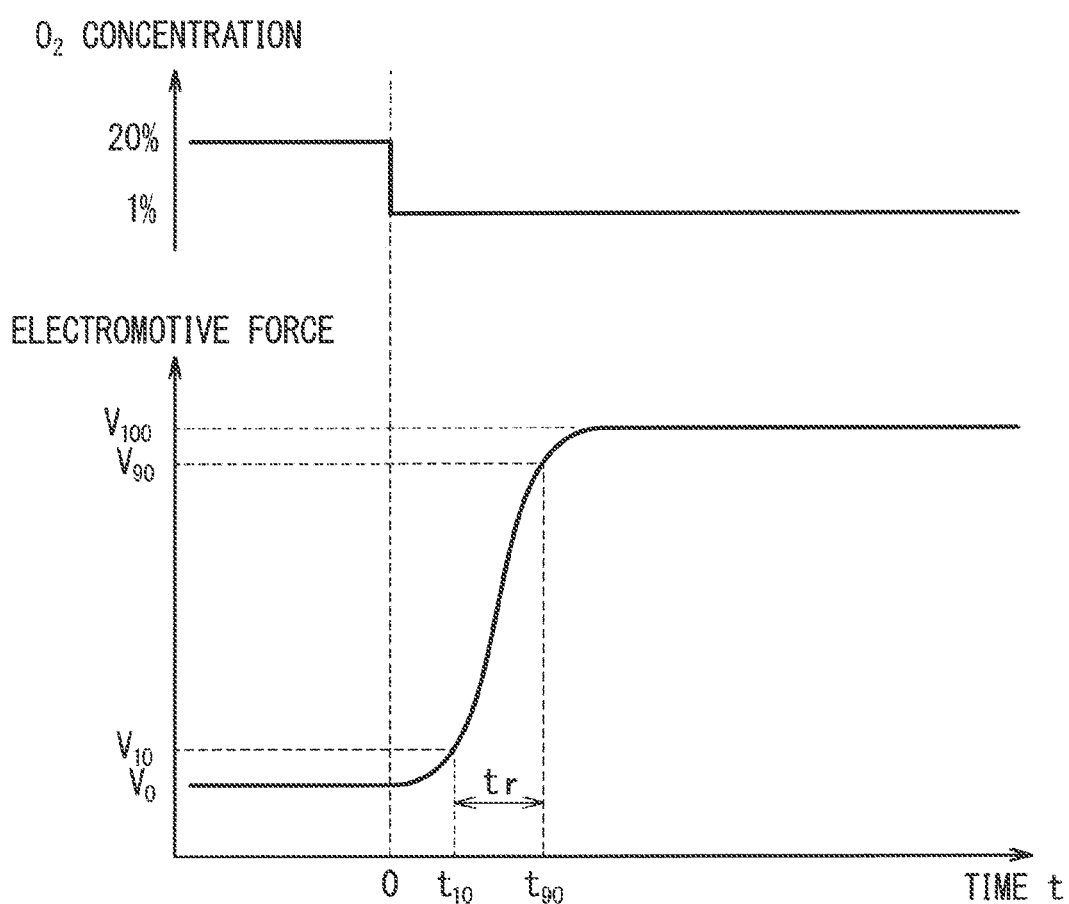

F I G. 11A
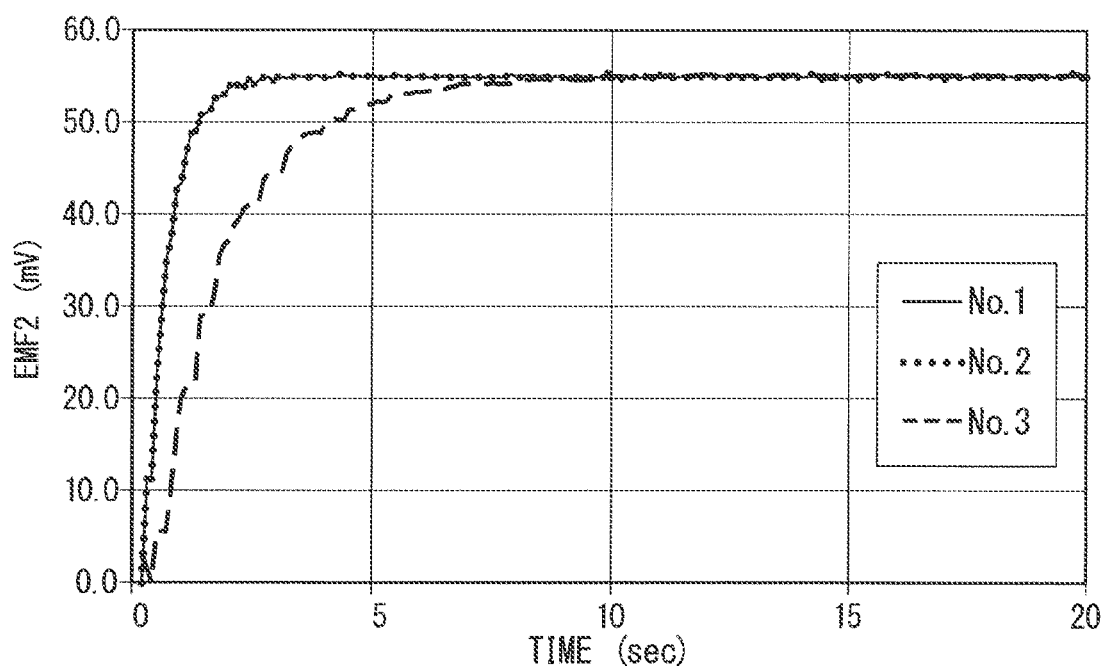
F I G. 11B
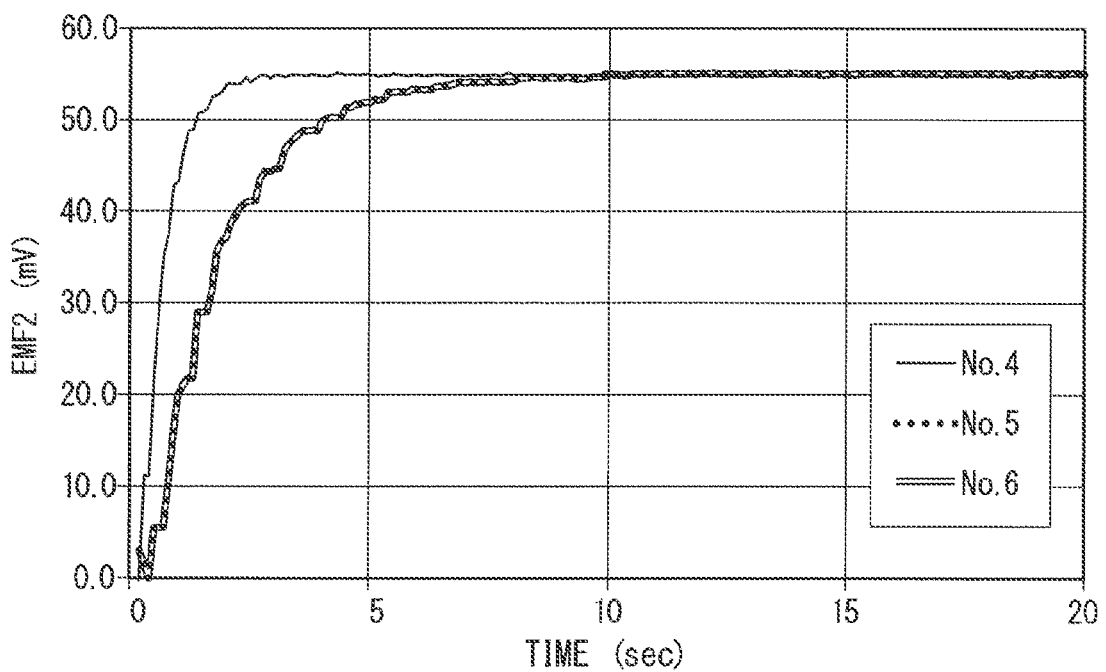

GAS SENSOR

CROSS-REFERENCE TO RELATED APPLICATION

The present application claims priority from Japanese application JP 2018-043919, filed on Mar. 12, 2018, the contents of which is hereby incorporated by reference into this application.

BACKGROUND OF THE INVENTION

Field of the Invention

The present invention relates to a mixed-potential gas sensor, and particularly relates to a responsivity thereof.

Description of the Background Art

A mixed-potential gas sensor configured to sense hydrocarbon, carbon monoxide, ammonia, or the like is already known (refer to Japanese Patent Application Laid-Open No. 2016-033510 and Japanese Patent Application Laid-Open No. 2017-116371, for example).

The mixed-potential gas sensor determines the concentration of a sensing target gas component by exploiting the fact that a potential difference (sensor output) generated between a sensing electrode provided to be in contact with measurement gas and variable in potential in accordance with the concentration of a sensing target gas present in the measurement gas and a reference electrode provided to have a substantially constant potential has a correlation with the concentration of the sensing target gas in the measurement gas.

In a case in which the above-described hydrocarbon, carbon monoxide, ammonia, or the like is to be sensed, when oxygen is present in addition to the sensing target gas in measurement gas, the sensor output interferes with oxygen. In other words, since the sensor output value fluctuates with the concentration of oxygen existing in the measurement gas, it is necessary to correct the sensor output or the concentration of the sensing target gas based on the concentration of oxygen to accurately determine the concentration of the sensing target gas.

For example, when hydrocarbon, carbon monoxide, or ammonia is to be sensed with a mixed-potential gas sensor in an exhaust path from an internal combustion of an automobile engine or the like, the concentration of oxygen can be identifies based on an output value from an oxygen sensor, an A/F sensor, an NOx sensor, or the like provided separately from the mixed-potential gas sensor.

However, since these sensors are not necessarily provided in the vicinity of the mixed-potential gas sensor, it is necessary to consider gas time lag to improve the accuracy of measurement of the sensing target gas. In addition, the flow speed of the exhaust gas from the internal combustion engine is not constant but changes every moment, and thus it is not necessarily easy to excellently perform the correction based on the oxygen concentration.

SUMMARY

The present invention relates to a mixed-potential gas sensor, and particularly relates to a responsivity thereof.

According to the present invention, a mixed-potential gas sensor configured to sense a sensing target gas component contained in measurement gas and identify a concentration of the sensing target gas component includes: a sensor element made of an oxygen-ion conductive solid electrolyte; a first sensing electrode as a cermet electrode provided on a surface of the sensor element on one leading end part side and containing a Pt—Au alloy; a second sensing electrode as a cermet electrode provided on the surface of the sensor element on the one leading end part side and containing Pt; a reference electrode provided inside the sensor element to be made contact with air; an electrode protective layer as a porous layer covering the first and second sensing electrodes; a housing inside which the sensor element is fixed; a protective cover that is attached to the housing and surrounds the one leading end part of the sensor element and into which measurement gas flows; and a concentration identification element configured to identify the concentration of the sensing target gas component in the measurement gas, the concentration identification element being configured to acquire, while the gas sensor is disposed in the measurement gas, a first sensor output as a potential difference occurring between the first sensing electrode and the reference electrode in accordance with the concentration of the sensing target gas component and a concentration of oxygen, and a second sensor output as a potential difference occurring between the second sensing electrode and the reference electrode in accordance with the concentration of oxygen, and identify the concentration of the sensing target gas component in the measurement gas based on the first and second sensor outputs. The first sensing electrode and the second sensing electrode are disposed on the surface of the sensor element on the one leading end part side so that the measurement gas flowing into the protective cover reaches the first sensing electrode earlier than the second sensing electrode.

According to the present invention, the concentration of a sensing target gas component can be identified without oxygen interference at preferable accuracy while a responsivity is achieved.

The present invention is intended to provide a gas sensor capable of accurately measuring sensing target gas even under oxygen interference.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram illustrating a response measurement profile;

FIGS. 11A and 11B are diagrams exemplarily illustrating a response measurement profile of the second sensing electrode 10B.

DESCRIPTION OF THE PREFERRED EMBODIMENTS

<Overview of Gas Sensor>

A gas sensor according to a preferred embodiment of the present invention has two aspects with different combinations of disposition of each sensing electrode and the shape and configuration of each protective cover. Each aspect will be sequentially described below.

(First Aspect)

Figure 1:
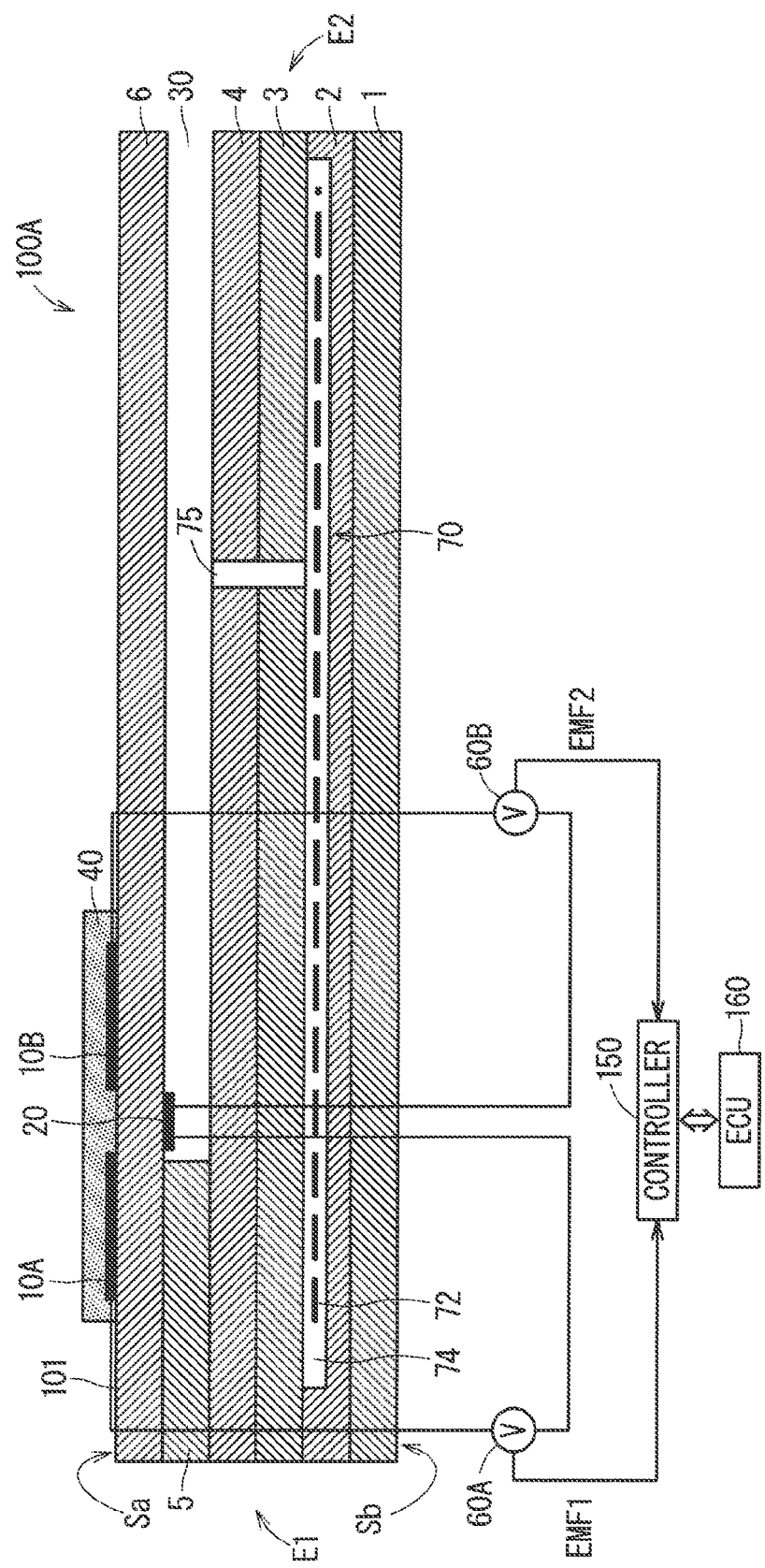
FIG. 1 is a sectional pattern diagram schematically illustrating the configuration of a main part of a gas sensor 100A according to a first aspect.

FIG. 1 is a sectional pattern diagram schematically illustrating the configuration of a main part of a gas sensor 100A according to a first aspect; The gas sensor 100A is what is called a mixed-potential gas sensor. Generally, the gas sensor 100A determines the concentration of a gas component to be sensed (sensing target gas component) by exploiting the fact that potential difference (electromotive force) occurs between a first sensing electrode 10A provided on the surface of the sensor element 101A mainly made of ceramic as oxygen-ion conductive solid electrolyte such as zirconia ($ZrO_2$) and a reference electrode 20 provided inside the sensor element 101A, due to difference in the concentration of the sensing target gas component in the vicinities of the electrodes based on the principle of mixed potential. Hereinafter, the first sensing electrode 10A, the reference electrode 20, and the solid electrolyte between both electrodes are referred to as a first mixed potential cell.

More specifically, the gas sensor 100A is used to excellently determine the concentration of a predetermined gas component (sensing target gas component) in measurement gas that is exhaust gas in an exhaust pipe of an internal combustion engine such as a diesel engine or a gasoline engine. Examples of the sensing target gas component include hydrocarbon gas such as $C_2H_4$, $C_3H_6$, or n-C8, carbon monoxide (CO), and ammonia ($NH_3$).

When a plurality of kinds of gasses that can be sensed by the gas sensor 100A exist in the measurement gas, the potential difference generated between the first sensing electrode 10A and the reference electrode 20 is a value attributable to all the plurality of kinds of gasses, and thus the determined concentration value is the sum of the concentrations of the plurality of kinds of gasses. In particular, in a large number of situations in which the gas sensor 100A is used, exhaust gas as measurement gas contains oxygen, which can be sensed by the gas sensor 100A, similarly to the above-described sensing target component. Thus, even when gas of a kind other than oxygen is assumed as the sensing target component, under the existence of oxygen, the potential difference generated between the first sensing electrode 10A and the reference electrode 20 in the first mixed potential cell also depends on the oxygen concentration of the measurement gas. This characteristic that the potential difference generated between the electrodes in the first mixed potential cell, and a concentration of a sensing target gas component identified based on the potential difference are affected by the existence of oxygen in the measurement gas is referred to as, for example, an $O_2$ interference. The $O_2$ interference needs to be removed to achieve the accuracy of measurement of the sensing target gas component.

In the sensor element 101A, similarly to the first sensing electrode 10A, a second sensing electrode 10B is provided on the surface of the sensor element 101A to accomplish that purpose. When the concentration of the sensing target gas component is identified, correction is performed by using the potential difference generated between the second sensing electrode 10B and the reference electrode 20 in accordance with the oxygen concentration of the measurement gas. Hereinafter, the second sensing electrode 10B, the reference electrode 20, and the solid electrolyte between both electrodes are referred to as a second mixed potential cell.

In addition, the sensor element 101A mainly includes a reference gas introduction space 30 in which the reference electrode 20 is disposed, a protective layer 40 covering the first sensing electrode 10A and the second sensing electrode 10B, in addition to the first sensing electrode 10A, the second sensing electrode 10B, and the reference electrode 20 described above.

<<Details of Components>>

The sensor element 101A has a structure in which six layers of a first solid electrolyte layer 1, a second solid electrolyte layer 2, a third solid electrolyte layer 3, a fourth solid electrolyte layer 4, a fifth solid electrolyte layer 5, and a sixth solid electrolyte layer 6, which are made of an oxygen-ion conductive solid electrolyte, are stacked in the stated order from the bottom side in the drawings, and additionally includes electrodes and other components mainly between the layers or on an outer peripheral surface of the element. The solid electrolyte forming the six layers is fully dense and airtight. Such a sensor element 101A is manufactured by, for example, laminating ceramic green sheets corresponding to the individual layers, which have been subjected to a predetermined process and printing of a circuit pattern, and further, by integrating the laminated layers through firing.

However, it is not essential that the gas sensor 100A include the sensor element 101A as such a six-layer laminated body. The sensor element 101A may be formed as a laminated body having a larger or smaller number of layers, or may not have a laminated structure.

In the following description, for sake of convenience, a surface located above the sixth solid electrolyte layer 6 in the drawings is referred to as a front surface Sa of the sensor element 101A, and a surface located below the first solid electrolyte layer 1 in FIGS. 1A and 1B is referred to as a rear surface Sb of the sensor element 101A. When the gas sensor 100A is used to determine the concentration of the sensing target gas component in the measurement gas, a predetermined range extending from a leading end part E1 as one end part of the sensor element 101A and including at least the first sensing electrode 10A and the second sensing electrode 10B is disposed in a measurement gas atmosphere, and the remaining part including a base end part E2 as the other end part is disposed not in contact with the measurement gas atmosphere.

The first sensing electrode 10A senses the sensing target gas component. The first sensing electrode 10A is formed as a porous cermet electrode including an alloy containing Au of a predetermined ratio and Pt, in other words, a Pt—Au alloy, and zirconia. The catalytic activity of the first sensing electrode 10A for the sensing target gas component is disabled in a predetermined concentration range by excellently determining the composition of the Pt—Au alloy as the material of the sensing electrode 10. In other words, decomposition reaction of the sensing target gas component at the first sensing electrode 10A is suppressed. Accordingly, in the gas sensor 100A, the potential of the first sensing electrode 10A varies selectively for the sensing target gas component in accordance with (in correlation with) the concentration of the sensing target gas component. In other words, the first sensing electrode 10A has such a characteristic that the potential thereof has high concentration dependency on the sensing target gas component in a predetermined concentration range but has small concentration dependency on any other component of the measurement gas.

More specifically, the first sensing electrode 10A is provided so as to excellently have an Au abundance ratio on the surface of the Pt—Au alloy particles constituting the electrode, thereby exhibiting remarkable dependency of potential on the concentrations of the sensing target gas component and oxygen.

The Au abundance ratio is preferably set to be, for example, 0.4 or higher when the sensing target gas component is ammonia gas, or 0.3 or higher when the sensing target gas component is hydrocarbon gas.

In the specification, the Au abundance ratio is the area ratio of a part covered by Au relative to a part at which Pt is exposed on the surface of a noble metal particle (Pt—Au alloy particle) included in the first sensing electrode 10A. For example, the Au abundance ratio can be calculated through the following equation by using detected values of Au and Pt in an Auger spectrum obtained by performing Auger electron spectroscopy (AES) analysis on the surface of the noble metal particle:

$$\text{Au abundance ratio=Au detected value/Pt detected value} \quad (1)$$

Alternatively, the Au abundance ratio may be calculated by a relative sensitivity coefficient method based on the peak intensities of Au and Pt at detection peaks, which can be obtained by X-ray photoelectron spectroscopy (XPS). The Au abundance ratio is 1 when the area of the part at which Pt is exposed is equal to the area of the part covered by Au.

The first sensing electrode 10A may be formed to have a porosity equal or more than 10% and equal or less than 40%, and a thickness equal or more than 5 μm and equal or less than 35 μm. In the present preferred embodiment, the porosity of each of various kinds of electrodes and layers can be identified from a binary image of a cross-sectional SEM image (secondary electron image) of the target electrode or layer by a well-known method.

The second sensing electrode 10B senses oxygen. The second sensing electrode 10B is formed as a porous cermet electrode of Pt and zirconia. Since the second sensing electrode 10B contains no Au, the second sensing electrode 10B has catalytic activity for the sensing target gas component. Thus, the second sensing electrode 10B is provided to exhibit remarkable dependency of potential on the concentration of oxygen.

The second sensing electrode 10B may be formed to have a porosity equal or more than 10% and equal or less than 40%, and a thickness equal or more than 5 μm and equal or less than 35 μm.

Figure 2:
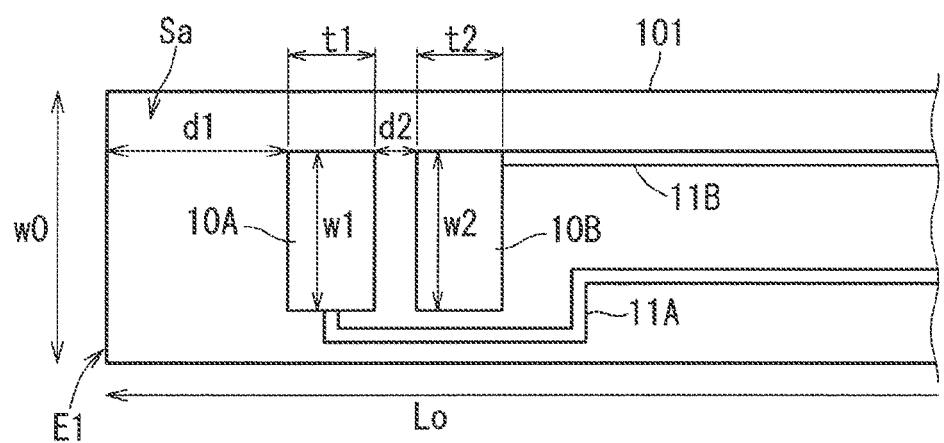
FIG. 2 is a plan view for description of the arrangement positions of a first sensing electrode 10A and a second sensing electrode 10B on a surface Sa of a sensor element 101A and the sizes of both electrodes.

FIG. 2 is a plan view for description of the arrangement positions of a first sensing electrode 10A and a second sensing electrode 10B on a surface Sa of a sensor element 101A and the sizes of both electrodes; However, in FIG. 2, illustration of the electrode protective layer 40 is omitted. The sensor element 101 has a size L0 in the element longitudinal direction and a size w0 in an element width direction orthogonal to the element longitudinal direction.

Both the first sensing electrode 10A and the second sensing electrode 10B are rectangular in plan view. The first sensing electrode 10A is provided at a position separated from a leading end part E1 as one end part of the element longitudinal direction by a predetermined distance d1 on the surface Sa of the sensor element 101A, and the second sensing electrode 10B is provided at a position separated from the first sensing electrode 10A by a predetermined distance d2 on a side opposite to the leading end part E1 in the element longitudinal direction. This arrangement is in accordance with the flow of the measurement gas reaching from the outside to the first sensing electrode 10A and the second sensing electrode 10B. This will be described later in detail.

It is preferable that a size t1 of the first sensing electrode 10A and a size t2 of the second sensing electrode 10B in the element longitudinal direction are equal to each other, and a size w1 of the first sensing electrode 10A and a size w2 of the second sensing electrode 10B in the element width direction are equal to each other. It is preferable to have t1=t2=0.5 mm to 1.5 mm, w1=w2=2 mm, d1=3 mm to 5 mm, and d2=0.3 mm to 0.5 mm for L0=45 mm to 70 mm and w0=4 mm to 6 mm. When the values of w1, t1, w2, and t2 are excessively large, detection sensitivity is achieved but variance in the responsivity (described later) potentially occurs in each sensing electrode, and thus the values are not preferable. When d2 is excessively large, both sensing electrodes are separated too much, and thus spatial variance in the concentration of the measurement gas is highly likely to cause large influence. As a result, the correction based on the potential difference in the second mixed potential cell potentially cannot be excellently performed, and thus the value is not preferable.

Figure 3:
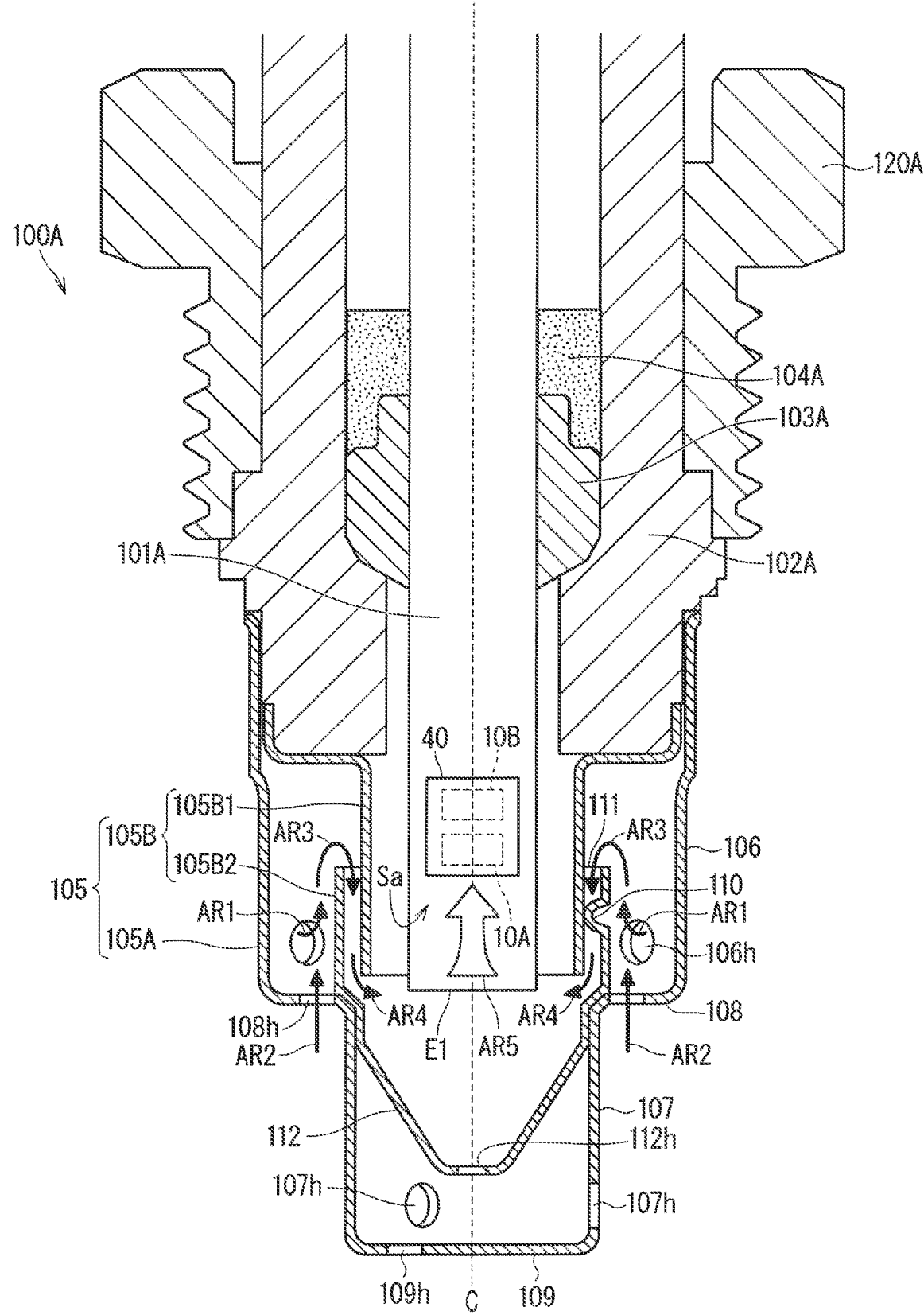
FIG. 3 is a diagram illustrating a configuration around the sensor element 101A in the gas sensor 100A according to the first aspect.

When the gas sensor 100A is used, part of the sensor element 101A, which extends from the leading end part E1 to at least a part in which the electrode protective layer 40 covering the first sensing electrode 10A is provided, is exposed to (directly in contact with) the measurement gas (refer to FIG. 3).

The reference electrode 20 having a substantially rectangular shape in plan view, is provided inside the sensor element 101A, and serves as a reference for determining the concentration of the measurement gas. The reference electrode 20 is formed as a porous cermet electrode of Pt and zirconia.

The reference electrode 20 may be formed to have a porosity equal or more than 10% and equal or less than 30% and a thickness equal or more than 5 μm and equal or less than 15 μm. As exemplarily illustrated in FIG. 1, the plane size of the reference electrode 20 may be smaller than or substantially equal to those of the first sensing electrode 10A and the second sensing electrode 10B.

The reference electrode 20 is exposed in the reference gas introduction space 30 provided inside the sensor element 101A.

The reference gas introduction space 30 is an internal space provided in a predetermined range from the base end part E2 of the sensor element 101A. Air (oxygen) as reference gas for calculating the concentration of the sensing target gas component is introduced into the reference gas introduction space 30 from the outside. Accordingly, when the gas sensor 100A is used, the circumference of the reference electrode 20 is always filled with the air (oxygen). Thus, during the use of the gas sensor 100A, the reference electrode 20 constantly has a constant potential.

The reference gas introduction space 30 is prevented from contacting with measurement gas by the surrounding solid electrolyte. Thus, the reference electrode 20 does not come into contact with the measurement gas even when the first sensing electrode 10A and the second sensing electrode 10B are exposed to the measurement gas.

In the configuration exemplarily illustrated in FIG. 1, the reference gas introduction space 30 is provided as a space in which part of the fifth solid electrolyte layer 5 is communicated with the outside on the base end part E2 side of the sensor element 101A.

The electrode protective layer 40 is a porous layer made of alumina, which is provided so as to cover at least the first sensing electrode 10A and the second sensing electrode 10B on the front surface Sa of the sensor element 101A. The electrode protective layer 40 is provided as an electrode protective layer that prevents or reduces the degradation of the first sensing electrode 10A and the second sensing electrode 10B due to continuous exposure to a measurement gas during the use of the gas sensor 100A.

It is preferable that the electrode protective layer 40 is provided to have a porosity of 30% to 45% and a thickness of 5 μm to 25 μm.

In FIG. 1, the case where the electrode protective layer 40 is formed only in the vicinity of the first sensing electrode 10A and the second sensing electrode 10B is exemplified, but the electrode protective layer 40 may be extended to a wider range. Alternatively, the electrode protective layer 40 may be provided as a leading end protective layer also covering the leading end part E1. Further alternatively, after the electrode protective layer 40 is formed as illustrated in FIG. 1, the leading end protective layer may be provided to cover the electrode protective layer 40. In the latter case, the leading end protective layer is formed to have a larger porosity than that of the electrode protective layer 40 so as not to affect the responsivity. Such a leading end protective layer can be formed by a well-known method such as plasma spraying, spray coating, gel cast, or dipping, around the sensor element 101A (fired body) obtained through a green sheet process described later. The thickness of the leading end protective layer can be easily controlled by any of the methods.

As illustrated in FIG. 1, the gas sensor 100A is equipped with a first potentiometer 60A capable of measuring a potential difference between the first sensing electrode 10A and the reference electrode 20 and a second potentiometer 60B capable of measuring a potential difference between the second sensing electrode 10B and the reference electrode 20. Although FIG. 1 schematically illustrates wiring between both of the first sensing electrode 10A and the reference electrode 20, and the first potentiometer 60A, and wiring between both of the second sensing electrode 10B and the reference electrode 20, and the second potentiometer 60B, in an actual sensor element 101A, connection terminals (not illustrated) are provided correspondingly to the respective electrodes on the front surface Sa or the rear surface Sb on the base end part E2 side, and wiring patterns (not illustrated), which connect the respective electrodes and their corresponding connection terminals, are formed on the front surface Sa and inside the element. FIG. 2 exemplarily illustrates lead lines 11A and 11B as part of the wires. The first sensing electrode 10A and the reference electrode 20 are electrically connected with the first potentiometer 60A, and the second sensing electrode 10B and the reference electrode 20 are electrically connected with the second potentiometer 60B via the wiring patterns and the connection terminals.

Hereinbelow, a potential difference between the first sensing electrode 10A and the reference electrode 20, which is measured by the first potentiometer 60A, is also referred to as a first sensor output or EMF1, and a potential difference between the second sensing electrode 10B and the reference electrode 20, which is measured by the second potentiometer 60B, is also referred to as a second sensor output or EMF2. The first sensor output and the second sensor output are both output to the controller 150 that controls the operation of the gas sensor 100A. The first sensor output and the second sensor output provided to the controller 150 are further provided to an electronic control unit (ECU) 160 that entirely controls the internal combustion engine. The electronic control unit (ECU) 160 performs computations based on these outputs, thereby determining the concentration of the sensing target gas component near the sensor element 101A.

The sensor element 101A further includes a heater part 70 configured to perform temperature adjustment involving heating and temperature maintenance of the sensor element 101A to increase the oxygen-ion conductivity of the solid electrolyte. The heater part 70 includes a heater 72, a heater insulating layer 74, and a pressure diffusion hole 75.

The heater 72 is an electric resistor provided inside the sensor element 101A. The heater 72, which is connected with a heater electrode (not illustrated) being in contact with the rear surface Sb of the sensor element 101A (a lower surface of the first solid electrolyte layer 1 in FIG. 1), generates heat by being fed power via the heater electrode to heat the solid electrolytes forming the sensor element 101A and maintain their temperatures.

In the case illustrated in FIG. 1, the heater 72 is buried while being vertically sandwiched between the second solid electrolyte layer 2 and the third solid electrolyte layer 3 so as to range from the base end part E2 to the positions below the first sensing electrode 10A and the second sensing electrode 10B near the leading end part E1. With this configuration, the entire sensor element 101A can be adjusted to a temperature at which the solid electrolyte is activated.

The heater insulating layer 74 is made of insulator such as alumina and formed on upper and lower surfaces of the heater 72. The heater insulating layer 74 is formed to provide electric insulation between the second solid electrolyte layer 2 and the heater 72 and electric insulation between the third solid electrolyte layer 3 and the heater 72.

The pressure diffusion hole 75 is a site penetrating through the third solid electrolyte layer 3 and the fourth solid electrolyte layer 4, and communicated with the reference gas introduction space 30. The pressure diffusion hole 75 is formed to reduce increase in internal pressure along with increase in temperature inside the heater insulating layer 74.

<<Sealing of Sensor Element and Protective Cover>>

FIG. 3 is a diagram illustrating a configuration around the sensor element 101A (particularly, around the leading end part E1) in the gas sensor 100A according to the first aspect.

In the gas sensor 100A, the sensor element 101A is housed in a housing 102A that is a hollow cylindrical member excluding the vicinity of the leading end part E1. More specifically, prior to such housing, annular components such as the ceramic supporter 103A and the powder compact 104A are mounted around the outer periphery of the sensor element 101A, the housing 102A is annularly mounted on the outer periphery of the annular components, subsequently, the powder compact 104A is compressed by applying an external force, thereby, a state in which the sensor element 101A is fixed in the housing 102A and the space between the leading end part E1 and the base end part E2 is airtightly sealed is realized. This fixing is performed in such a manner that the central axis of the sensor element 101A coincides with the central axis C of the internal space of the cylindrical housing 102A. For simplicity of illustration, only one ceramic supporter 103A and one powder compact 104A are illustrated in FIG. 3, but actually, a plurality of ceramic supporters 103A and a plurality of powder compacts 104A are stacked alternately.

Further, a screw nut 120A is provided around the outer periphery of the housing 102A, and the gas sensor 100A is to be screwed and fixed to the measurement position by using a male screw part on the outer periphery of the screw nut 120A.

Further, the gas sensor 100A includes a protective cover 105 surrounding a predetermined range including the leading end part E1 of the sensor element 101A and the formation positions of the first sensing electrode 10A and the second sensing electrode 10B and attached to a leading end part of the housing 102A (the lower end part in FIG. 3). The protective cover 105 has a two-layer structure of an outer protective cover 105A and an inner protective cover 105B.

The outer protective cover 105A is a part that comes into direct contact with the measurement gas when the gas sensor 100A is used. The outer protective cover 105A has a stepped sectional shape and includes a cylindrical large diameter part 106 including a fixing part to a lower end part of the outer periphery of the housing 102A as viewed in the drawing, a bottomed cylindrical small diameter part 107 having a diameter smaller than that of the large diameter part 106, and a stepped part 108 connecting the large diameter part 106 and the small diameter part 107. The large diameter part 106 and the stepped part 108 include through-holes 106$h$ and 108$h$, respectively, through which the measurement gas flows into the outer protective cover 105A. A plurality of the through-holes 106$h$ and 108$h$ are provided at appropriate intervals in the circumferential direction. The small diameter part 107 and a bottom part 109 thereof include through-holes 107$h$ and 109$h$ through which the measurement gas flows out of the outer protective cover 105A. A plurality of the through-holes 107$h$ are provided at appropriate intervals in the circumferential direction.

The inner protective cover 105B includes a cylindrical first part 105B1 extending from the fixing part to the lower end part of the housing 102A as viewed in the drawing, and a second part 105B2 attached outside the first part 105B1. The second part 105B2 is provided with a crimp part 110 from outside, fixed to the first part 105B1 so that a flow path 111 is formed between the second part 105B2 and the first part 105B1, and locked to the corner between the small diameter part 107 and the stepped part 108 of the outer protective cover 105A.

A lower end part of the first part 105B1 as viewed in the drawing is open, whereas a lower end part of the second part 105B2 as viewed in the drawing is a taper part 112, and a through-hole 112$h$ is provided at a leading end part (lower end part) thereof. The leading end part E1 of the sensor element 101A slightly protrudes from the lower end part of the first part 105B1 as viewed in the drawing. The distance between the leading end part E1 and the bottom part 109 of the outer protective cover 105A is 10 mm approximately.

When the gas sensor 100A including the protective cover 105 having the above-described configuration is used, the measurement gas flows into a space between the outer protective cover 105A and the inner protective cover 105B through the through-holes 106$h$ and 108$h$ as indicated with Arrows AR1 and AR2. The measurement gas further flows into a space in the inner protective cover 105B, in which a vicinity part of the leading end part E1 of the sensor element 101A exists, through the flow path 111 between the first part 105B1 and the second part 105B2 of the inner protective cover 105B as indicated with Arrows AR3 and AR4. As indicated with Arrow AR5, part of the measurement gas having flowed into the space in this manner reaches the vicinity of the electrode protective layer 40 covering the first sensing electrode 10A and the second sensing electrode 10B, from the leading end part E1 side, and then reaches the first sensing electrode 10A and the second sensing electrode 10B through the electrode protective layer 40.

In this manner, the protective cover 105 according to the first aspect is provided so that the measurement gas flows into the protective cover 105 from the leading end part E1 side of the sensor element 101A positioned therein. A protective cover having such a configuration is also referred to as a "leading-end-inflow type" protective cover. The measurement gas in the inner protective cover 105B is discharged to the outside through the through-hole 112$h$ and further through the through-holes 107$h$ and 109$h$ as appropriate.

(Second Aspect)

Figure 4:
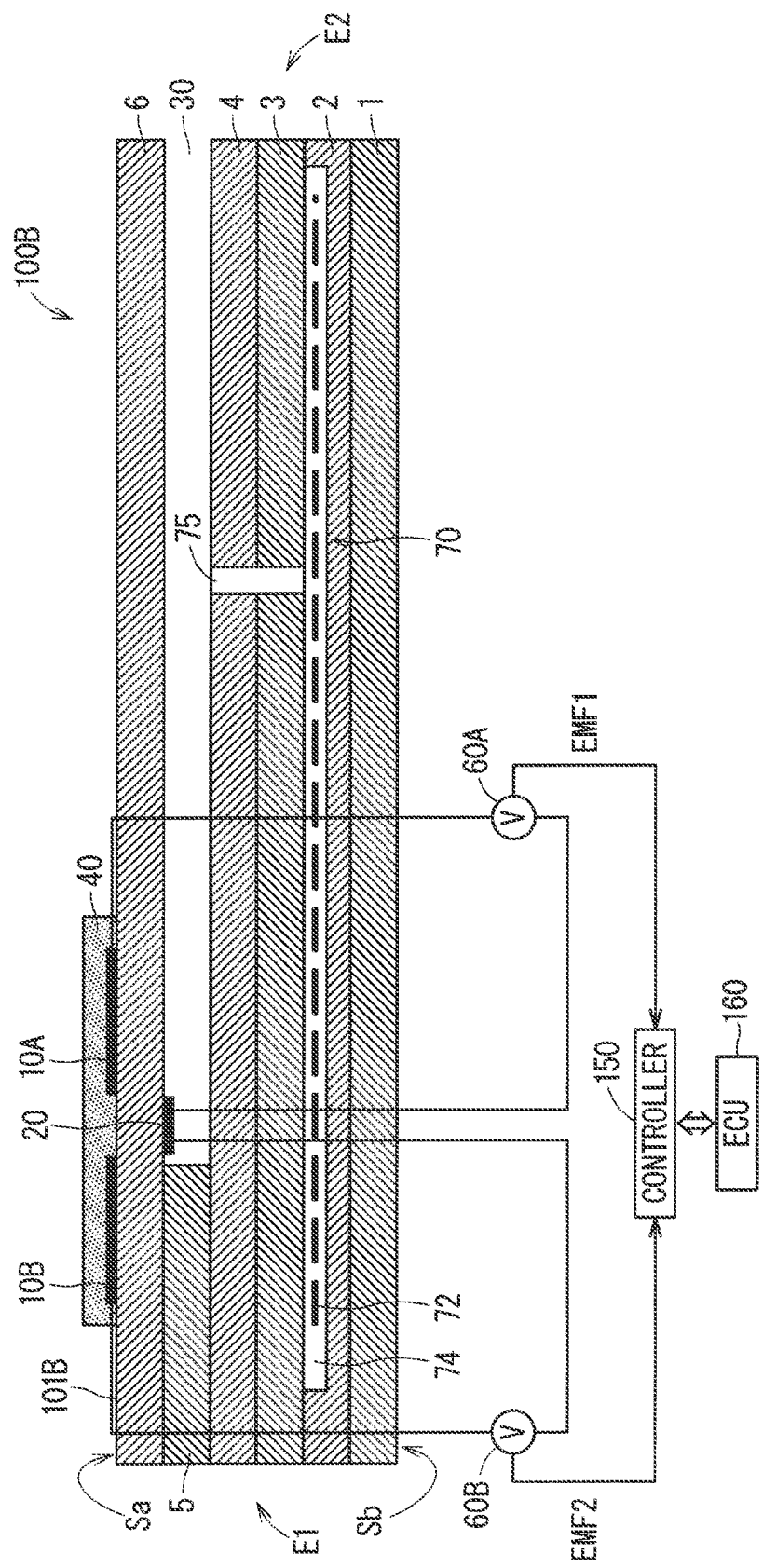
FIG. 4 is a sectional pattern diagram schematically illustrating the configuration a main part of a gas sensor 100B according to a second aspect.

FIG. 4 is a sectional pattern diagram schematically illustrating the configuration a main part of a gas sensor 100B according to a second aspect; Similarly to the gas sensor 100A according to the first aspect, the gas sensor 100B includes a sensor element 101B mainly made of ceramic as oxygen-ion conductive solid electrolyte such as zirconia ($ZrO_2$). Moreover, the sensor element 101B has a configuration same as that of the sensor element 101A except that the disposition positions of the first sensing electrode 10A and the second sensing electrode 10B are opposite to those of the sensor element 101A included in the gas sensor 100A according to the first aspect. Specifically, the gas sensor 100B has a configuration same as that of the gas sensor 100A according to the first aspect except that the arrangement positions of the first sensing electrode 10A and the second sensing electrode 10B illustrated in FIG. 2 are interchanged, and accordingly, the connection destinations of a wiring pattern including the lead lines 11A and 11B are interchanged. Thus, any component identical to that of the gas sensor 100A is denoted by an identical reference sign, and thus detailed description thereof will be omitted below.

Figure 5:
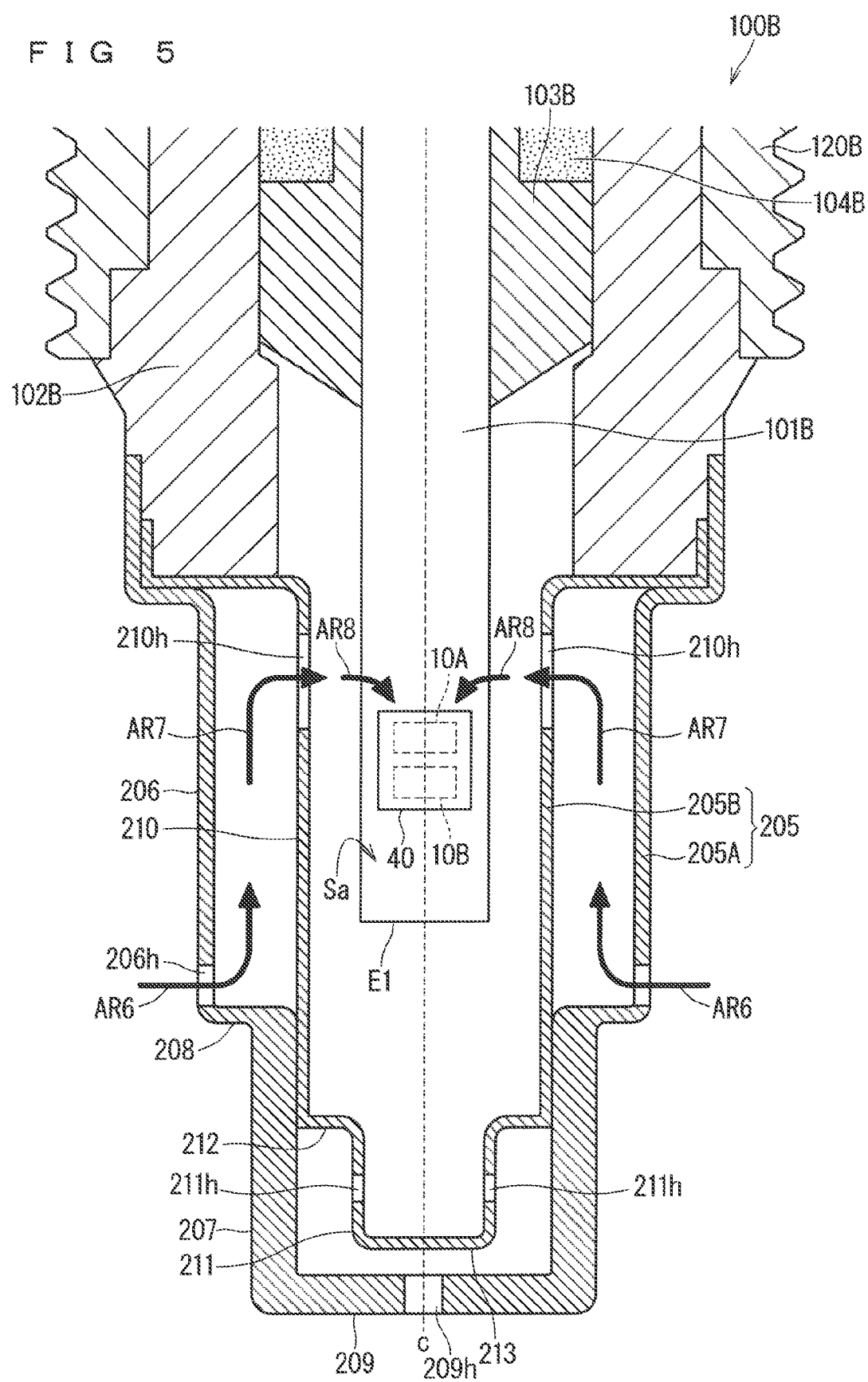
FIG. 5 is a diagram illustrating a configuration around a sensor element 101B in the gas sensor 100B according to the second aspect.

FIG. 5 is a diagram illustrating a configuration of around the sensor element 101B in the gas sensor 100B according to the second aspect (in particular, around the leading end part E1).

Similarly to the gas sensor 100A according to the first aspect, in the gas sensor 100B, the sensor element 101B is housed in a hollow cylindrical housing 102B except for the vicinity of the leading end part E1. At the housing, the fixation of the sensor element 101B by annular components such as a ceramic supporter 103B and a powder compact 104B, and the airtight sealing of the space between the leading end part E1 and the base end part E2 are achieved in a similar manner. In addition, a screw nut 120B is provided in a similar manner.

In addition, similarly to the gas sensor 100A according to the first aspect, the gas sensor 100B includes a protective cover 205 surrounding the leading end part E1 of the sensor element 101B and attached to one leading end part (lower end part in FIG. 5) of the housing 102B. Similarly to the protective cover 105 provided to the gas sensor 100A according to the first aspect, the protective cover 205 has a two-layer structure of an outer protective cover 205A and an inner protective cover 205B. However, the structures thereof are slightly different from those of the outer protective cover 105A and the inner protective cover 105B included in the protective cover 105.

The outer protective cover 205A has a stepped sectional shape including a cylindrical large diameter part 206 extending from a fixing part to a lower end part of the outer periphery of the housing 102B as viewed in the drawing, a bottomed cylindrical small diameter part 207 having a diameter smaller than that of the large diameter part 206, and a stepped part 208 connecting the large diameter part 206 and the small diameter part 207. The large diameter part 206 includes a through-hole 206$h$ through which the measurement gas flows into the outer protective cover 205A. A plurality of the through-holes 206$h$ are provided near the stepped part 208 at appropriate intervals in the circumferential direction. A bottom part 209 of the small diameter part 207 includes a through-hole 209$h$ through which the measurement gas flows out of the outer protective cover 205A.

The inner protective cover 205B has a stepped sectional shape including a cylindrical large diameter part 210 extending from the fixing part to the lower end part of the housing 102B as viewed in the drawing, a bottomed cylindrical small diameter part 211 having a diameter smaller than the large diameter part 210, and a stepped part 212 connecting the large diameter part 210 and the small diameter part 211. However, the large diameter part 210 is engaged with the small diameter part 207 of the outer protective cover 205A, and the small diameter part 211 of the inner protective cover 205B is positioned in the small diameter part 207.

Side surfaces of the large diameter part 210 and the small diameter part 211 include through-holes 210$h$ and 211$h$, respectively. A plurality of the through-holes 210$h$ are provided at appropriate intervals in the circumferential direction near the fixing part of the inner protective cover 205B to the housing 102B. A plurality of the through-holes 211$h$ are provided at appropriate intervals in the circumferential direction. The sensor element 101B is fixed in the housing 102B at such a position that the formation positions of the first sensing electrode 10A and the second sensing electrode 10B are closer to the small diameter part 211 than the formation position of the through-hole 210$h$. The distance between the leading end part E1 and the bottom part 209 of the outer protective cover 205A is 10 mm approximately.

When the gas sensor 100B including the protective cover 205 having the above-described configuration is used, the measurement gas flows into the space between the outer protective cover 205A and the inner protective cover 205B through the through-hole 206$h$ as indicated with Arrow AR6. Then, as indicated with Arrow AR7, the measurement gas flows into the space in the inner protective cover 205B, in which the sensor element 101B exists, through the through-hole 210$h$ provided to the side surface of the inner protective cover 205B. As indicated with Arrow AR8, part of the measurement gas having flowed into the space in this manner reaches the vicinity of the electrode protective layer 40 covering the first sensing electrode 10A and the second sensing electrode 10B from a side of the sensor element 101B, and then reaches the first sensing electrode 10A and the second sensing electrode 10B through the inside of the electrode protective layer 40.

In this manner, the protective cover 205 according to the second aspect is provided so that the measurement gas flows into the protective cover 205 from the vicinity (side) of the side surface of the sensor element 101B housed therein. A protective cover having such a configuration is also referred to as a "side-surface-inflow type" protective cover.

The measurement gas in the inner protective cover 205B is discharged to the outside through the through-hole 211$h$ and further through the through-hole 209$h$ as appropriate.

<Process of Manufacturing Sensor Element>

Next, the process of manufacturing the sensor elements 101A and 101B will be described using an example case where the sensor elements have the layer structures as illustrated in FIGS. 1 and 4. Generally speaking, the sensor element 101A illustrated in FIG. 1 and the sensor element 101B illustrated in FIG. 4 are each manufactured by forming a laminated body formed of green sheets containing an oxygen-ion conductive solid electrolyte such as zirconia as a ceramic component and by cutting and firing the laminated body. Examples of the oxygen-ion conductive solid electrolyte include yttrium partially stabilized zirconia (YSZ).

Figure 6:
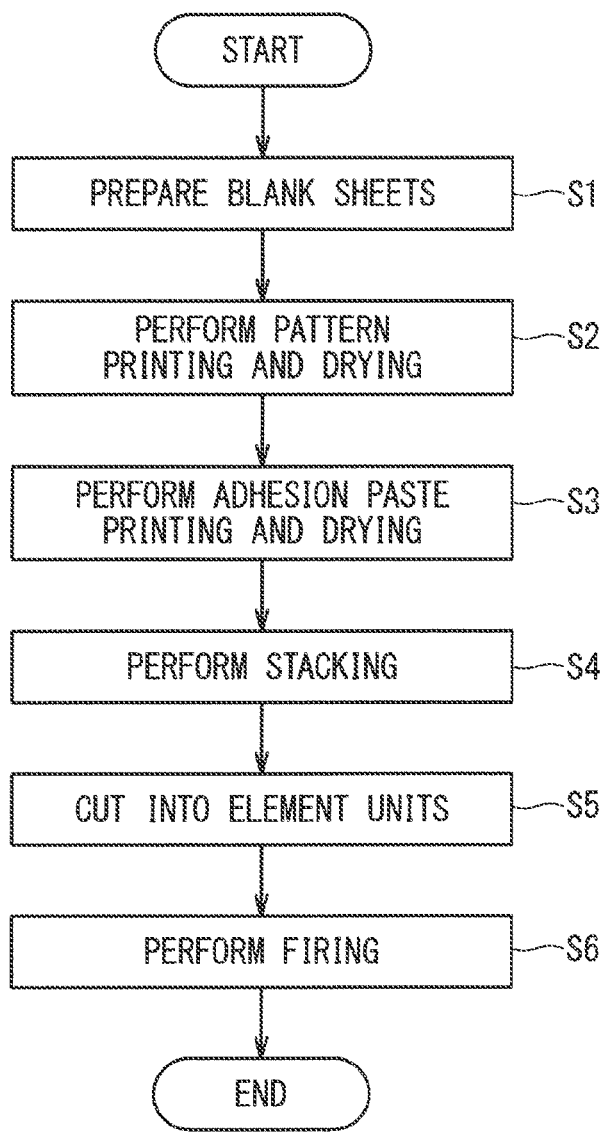
FIG. 6 is a diagram illustrating the flow of processing of producing the sensor elements 101A and 101B.

FIG. 6 is a diagram illustrating the flow of processing of producing the sensor elements 101A and 101B; When the sensor elements 101A and 101B are manufactured, first, a blank sheet (not illustrated), which is a green sheet on which no pattern is formed, is prepared (step S1). Specifically, six blank sheets corresponding to the first to sixth solid electrolyte layers 1 to 6 are prepared when the sensor elements 101A and 101B are manufactured. Each blank sheet is provided with a plurality of sheet holes used for positioning at printing and laminating. The sheet holes are formed in advance through, for example, punching processing by a punching apparatus. For a green sheet, the corresponding layer of which is the reference gas introduction space 30, a penetrating part corresponding to the reference gas introduction space 30 is also provided in advance through, for example, the same punching processing. All blank sheets corresponding to the respective layers of the sensor elements 101A and 101B do not need to have identical thickness.

When the blank sheets corresponding to the respective layers are prepared, pattern printing and dry processing are performed to form various kinds of patterns on each blank sheet (step S2). Specifically, for example, electrode patterns of the first sensing electrode 10A, the second sensing electrode 10B, the reference electrode 20, and the like, patterns of the electrode protective layer 40, patterns of the heater 72, the heater insulating layer 74, and the like, and patterns of internal wires (not illustrated) are formed.

The printing of each pattern is performed by applying, to a blank sheet, pattern formation paste prepared in accordance with a characteristic requested for each formation target by using a well-known screen printing technique. Well-known drying means may be employed for the dry processing after the printing.

Conductive paste prepared so as to excellently achieve the above-described Au abundance ratio is used to form the first sensing electrode 10A. It is preferable to use conductive paste prepared by using a Au ion-containing liquid as a Au starting material and mixing the Au ion-containing liquid with powdered Pt, powdered zirconia, and a binder. Alternatively, the conductive paste may be prepared by using coated powder, which is obtained by coating powdered Pt with Au, as a Pt—Au alloy starting raw material. Both can be realized by known techniques.

After the pattern printing ends, printing and dry processing are performed on bonding paste used to stack and bond the green sheets corresponding to the respective layers (step S3). The printing of the bonding paste may employ a well-known screen printing technology, and the dry processing after the printing may employ well-known drying means.

Subsequently, press bonding processing is performed in which the green sheets on the bonding agent is applied are stacked in a predetermined order and bonded by pressing under predetermined temperature and pressure conditions to form one laminated body (step S4). Specifically, the green sheets as laminating targets are stacked and held on a predetermined stacking jig (not illustrated) through positioning with reference to the sheet holes, and then heated and pressurized together with the stacking jig by a stacking machine such as a well-known hydraulic pressure press machine. Pressure, temperature, and time with which the heating and the pressurization are performed depend on the laminator in use, but appropriate conditions may be determined to achieve favorable lamination.

After the laminated body is obtained as described above, the laminated body is subsequently divided into individual units (referred to as element bodies) of the sensor elements 101A and 101B through cutting at a plurality of places (step S5). The cut out element bodies are fired under predetermined conditions, thereby producing the sensor elements 101A and 101B as described above (step S6). Specifically, the sensor elements 101A and 101B are generated through integration firing of solid electrolyte layers and electrodes. The temperature of the firing is preferably equal or more than 1200° C. and equal or less than 1500° C. (for example, 1400° C.). When the integration firing is performed in this manner, each electrode in the sensor elements 101A and 101B has sufficient adhesion strength.

The sensor element 101A and 101B obtained through this process is housed in the housing 102A or 102B in the manner illustrated in FIG. 3 or FIG. 5.

<Identification of Sensing Target Gas Component Concentration>

The following describes a case where the concentration of the sensing target gas component in the measurement gas is obtained by using the gas sensor 100A or 100B having the above-described configuration. It is assumed that oxygen is contained in the measurement gas in addition to the sensing target gas component. The gas sensor 100A or 100B has a configuration based on the responsivity difference between the first sensing electrode 10A and the second sensing electrode 10B as described later, but the responsivity is not discussed below for simplification of description.

When the concentration of the sensing target gas component is determined by using the gas sensors 100A and 100B, only the predetermined ranges of the sensor elements 101A and 101B extending from the leading end part E1 and including at least the first sensing electrode 10A and the second sensing electrode 10B is positioned in a space in which the measurement gas exists (flows) as described above, whereas the base end part E2 side is isolated from the space. Then, air (oxygen) is supplied to the reference gas introduction space 30. The sensor elements 101A and 101B are heated to an appropriate temperature (for example, 650° C.) of 450° C. to 700° C. by the heater 72. The temperature of heating of the sensor elements 101A and 101B by the heater 72 when the gas sensors 100A and 100B are used also referred to as a drive temperature.

In this state, a potential difference is generated between both of the first sensing electrode 10A and the second sensing electrode 10B exposed to the measurement gas and the reference electrode 20 disposed in the air. However, as described above, the potential of the reference electrode 20 disposed in the air (constant oxygen concentration) atmosphere is kept constant, but the potential of the first sensing electrode 10A has concentration dependency on the sensing target gas component in the measurement gas. The potential of the second sensing electrode 10B has no concentration dependency on the sensing target gas component but has concentration dependency on oxygen. Thus, a certain functional relation (referred to as a sensitivity characteristic) is held between the concentration of the sensing target gas component and the first sensor output (EMF1). No dependency exists between the concentration of the sensing target gas component and the second sensor output (EMF2), but the second sensor output has a value in accordance with the oxygen concentration of the measurement gas.

In the following description, for example, the sensitivity characteristic for the first sensor output may be referred to as a first sensitivity characteristic.

In the actual determination of the concentration of the sensing target gas component, in advance, the first and second sensitivity characteristics are experimentally identified by measuring the first sensor output and the second sensor output for each of a plurality of different mixed gases as the measurement gas, each of which has a known concentration of the sensing target gas component. The resultant first and second sensitivity characteristics are then stored in the ECU 160.

Figure 7A:
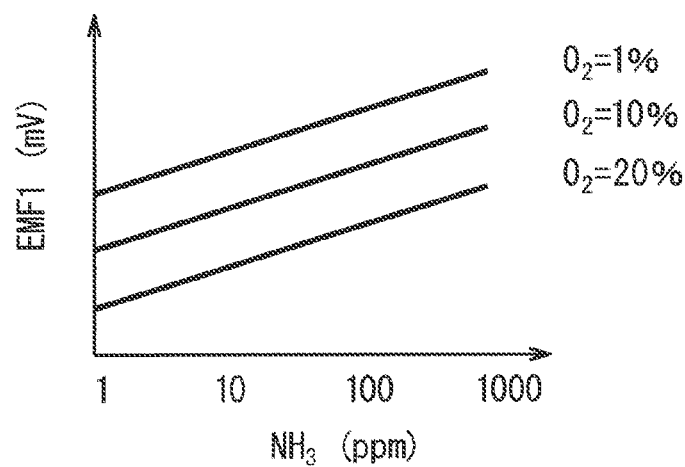
FIGS. 7A and 7B are diagrams schematically illustrating a sensitivity characteristic of the gas sensors 100A and 100B in the case that a sensing target gas component is ammonia ($NH_3$) gas.
Figure 7B:
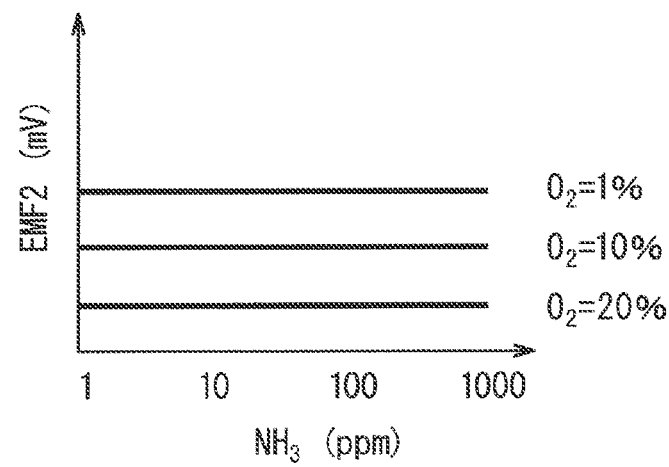

FIGS. 7A and 7B are diagrams schematically illustrating a sensitivity characteristic of the gas sensors 100A and 100B in the case that a sensing target gas component is ammonia ($NH_3$) gas. FIG. 7A exemplarily illustrates the first sensitivity characteristic, and FIG. 7B exemplarily illustrates the second sensitivity characteristic. The ammonia ($NH_3$) gas concentration on the horizontal axis is in the logarithmic scale.

As illustrated in FIG. 7A, the first sensitivity characteristic depends on the concentration of the sensing target gas component (ammonia ($NH_3$) gas) and the concentration of oxygen, but is linear relative to the logarithmic value of the concentration of the sensing target gas component under the condition of constant oxygen ($O_2$) concentration. As illustrated in FIG. 7B, the second sensitivity characteristic depends only on the oxygen ($O_2$) concentration, but does not depend on the concentration of the sensing target gas component. Although FIGS. 7A and 7B only exemplarily illustrate the sensitivity characteristics for the oxygen ($O_2$) concentrations of 1%, 10%, and 20%, the sensitivity characteristics may be identified for a larger number of oxygen concentrations for each of the gas sensors 100A and 100B.

When the gas sensors 100A and 100B are actually used, the first sensor output (EMF1) and the second sensor output (EMF2) that momentarily change in accordance with the concentration of the sensing target gas component are constantly acquired from the first mixed potential cell and the second mixed potential cell by the controller 150 and provided to the ECU 160. At the ECU 160, first, the concentration of oxygen of the measurement gas is identified based on the acquired value of the second sensor output. Then, the concentration of the sensing target gas component in the measurement gas is identified from the value of the first sensor output, using the first sensitivity characteristic corresponding to the above-identified concentration of oxygen. When the second sensitivity characteristic that provides the concentration of oxygen corresponding to the value of the second sensor output is not stored in the ECU 160, the concentration of oxygen of the measurement gas is identified by interpolation using the existing second sensitivity characteristics. When the first sensitivity characteristic corresponding to the identified oxygen concentration is not stored in the ECU 160, too, the concentration of oxygen of the measurement gas is identified by interpolation using the existing first sensitivity characteristics.

Such processing is performed each time the first sensor output and the second sensor output are acquired by the controller 150 and further the ECU 160. Thus, even when the measurement gas contains oxygen in addition to the sensing target gas component, the gas sensors 100A and 100B can identify the concentration of the sensing target gas component based on the first sensitivity characteristic in accordance with the concentration of oxygen. In this case, the controller 150 and the ECU 160 function as concentration identification means for identifying the concentration of the sensing target gas component.

As described above, in the present preferred embodiment, the concentration of the sensing target gas component is corrected based on the concentration of oxygen in a manner that different sensitivity characteristics are applied in accordance with the concentration of oxygen. By performing the correction, the gas sensors 100A and 100B according to the present preferred embodiment can identify the concentration of the sensing target gas component without the $O_2$ interference.

<Arrangement of Sensing Electrode and Protective Cover Type>

The identification of the concentration of the sensing target gas component in the above-described aspect is effective in that the 02 interference is excluded. However, this aspect is based on a premise that electromotive forces (sensor outputs) occurring to the first sensing electrode 10A and the second sensing electrode 10B at identical timings are used to identify the concentration of the sensing target gas component. To be precise, it is known that, among the first sensor output and the second sensor output for the measurement gas having reached both electrodes at identical timings, the latter is output from the controller 150 earlier. In other words, the first sensor output and the second sensor output acquired by the controller 150 at identical timings are values for the measurement gas having reached the first sensing electrode 10A and the second sensing electrode 10B at different timings. This is because the electrode reaction rate of the first sensing electrode 10A containing Pt—Au alloy as a metal component is slower than the electrode reaction rate of the second sensing electrode 10B containing Pt only.

Thus, the second sensor output obtained from the second mixed potential cell including the second sensing electrode 10B responds more rapidly to change in the components of the measurement gas and thereby changes than the first sensor output obtained from the first mixed potential cell including the first sensing electrode 10A. In other words, the second sensing electrode 10B (or the second mixed potential cell including the second sensing electrode 10B) has a shorter response time or a more (relatively) excellent responsivity than the first sensing electrode 10A (or the first mixed potential cell including the first sensing electrode 10A).

If the concentration of the sensing target gas component is identified in the above-described aspect based on the first sensor output and the second sensor output obtained by the controller 150 at identical timings while there is such a response time difference or responsivity difference, the identification of the oxygen concentration based on the second sensor output is performed based on the measurement gas different from the measurement gas when the first sensor output is obtained, and as a result, the reliability of a finally obtained concentration of the sensing target gas component may be potentially degraded.

The following describes definition of the response time of a sensing electrode in the present preferred embodiment. FIG. 8 is a diagram illustrating a response measurement profile for the description.

In the present preferred embodiment, the response time of each sensing electrode is determined based on a result of measurement of change in the sensor output (electromotive force) of the sensing electrode when the concentration of oxygen in model gas is instantaneously changed from 20% to 1% while the gas sensor 100A or 100B is disposed in the model gas. The model gas contains $H_2O$ of 5% and $N_2$ as the balance in addition to oxygen. The model gas has a temperature of 120° C. and a flow rate of 200 L/min, and the sensor element 101 has a drive temperature of 650° C. Hereinafter, a condition for obtaining these response times is referred to as a response time measurement condition.

Specifically, as illustrated in FIG. 8, when the concentration of oxygen in the model gas is instantaneously changed from 20% to 1%, the electromotive force value changes accordingly. A temporal change profile of the electromotive force value as illustrated in FIG. 8, which is obtained in such a case is referred to as a response measurement profile. In the response measurement profile, the timing when the concentration of oxygen in the model gas is changed is set to t=0, $V_0$ represents the electromotive force value (the first sensor output or the second sensor output) before the concentration of oxygen in the model gas is changed to 1%, $V_{100}$ represents the electromotive force value when the electromotive force becomes stable after the concentration of oxygen is changed to 1% at t=0, $V_{10}$ represents the electromotive force value when change is made by 10% of the difference value between the values halfway through change of the electromotive force value from $V_0$ to $V_{100}$, and $V_{90}$ represents the electromotive force value when change is made by 90% similarly. In addition, $V_{10}$ represents the electromotive force value at $t=t_{10}$, $V_{90}$ represents the electromotive force value at $t=t_{90}$, and the value of $tr=t_{90}-t_{10}$ as the difference value therebetween is defined as the response time of the sensing electrode. The responsivity is more excellent as the response time is shorter.

In the present preferred embodiment, a response time of 10 seconds or shorter is achieved for each of the first sensing electrode 10A and the second sensing electrode 10B, by forming the electrode protective layer 40 to have a porosity equal or more than 30% and equal or less than 45% and a thickness equal or more than 5 μm and equal or less than 25 μm. Although a leading end protective layer is provided as described above in some cases, the leading end protective layer is provided while increase in the response time is avoided.

Additionally, in the present preferred embodiment, in view of the responsivity difference intrinsically possessed by the first sensing electrode 10A and the second sensing electrode 10B attributable to the composition difference therebetween as described above, the influence of the response time difference between the first mixed potential cell and the second mixed potential cell is set to be sufficiently small in light of measurement accuracy by contriving the combination of the disposition of the first sensing electrode 10A and the second sensing electrode 10B and the type of the protective cover.

Specifically, in the gas sensor 100A according to the first aspect, in which the leading-end-inflow type protective cover 105 is used, the first sensing electrode 10A having a responsivity less excellent than that of the second sensing electrode 10B is disposed closer to the leading end part E1 of the sensor element 101A than the second sensing electrode 10B as illustrated in FIG. 3. In other words, the first sensing electrode 10A is disposed closer to the flow path 111 as the inflow position of the measurement gas into the inner protective cover 105 than the second sensing electrode 10B. On the other hand, in the gas sensor 100B according to the second aspect, in which the side-surface-inflow type protective cover 205 is used, the first sensing electrode 10A is disposed far from the leading end part E1 of the sensor element 101B than the second sensing electrode 10B as illustrated in FIG. 5. In other words, the first sensing electrode 10A is disposed closer to the through-hole 210$h$ as the inflow position of the measurement gas into the inner protective cover 205 than the second sensing electrode 10B.

With this configuration, that is, in any of the gas sensor 100A according to the first aspect and the gas sensor 100B according to the second aspect, the measurement gas having flowed into the inner protective cover 105B or 205B first reaches the vicinity of the first sensing electrode 10A, and thereafter reaches the second sensing electrode 10B at slight delay. In other words, in any of the gas sensors 100A and 100B, the first sensing electrode 10A and the second sensing electrode 10B are disposed so that the first sensing electrode 10A contacts the measurement gas earlier than the second sensing electrode 10B. Then, in the gas sensors 100A and 100B, the reach time difference of the measurement gas between both electrodes compensates the responsivity difference between both electrodes attributable to the difference of the electrode reaction rate, and the concentration of the sensing target gas component can be identified at a preferable accuracy without $O_2$ interference.

When the response time difference between the first sensing electrode 10A and the second sensing electrode 10B is 2 seconds or shorter, it can be said that the concentration of the sensing target gas component is identified at excellent accuracy without $O_2$ interference in the gas sensors 100A and 100B. Furthermore, when the response time difference is 1 second or shorter, it can be said that the concentration of the sensing target gas component is identified at an extremely excellent accuracy without $O_2$ interference in the gas sensors 100A and 100B.

Example

A total of six kinds of gas sensors (No. 1 to No. 6) with different combinations of the type (hereinafter referred to as electrode arrangement type) of arrangement of the first sensing electrode 10A and the second sensing electrode 10B and the type of the protective cover were produced. As for the sizes of the components illustrated in FIG. 2, L0 was 63 mm, w0 was 4 mm, t1 and t2 were 1 mm, w1 and w2 were 2 mm, d1 was 4 mm, and d2 was 0.5 mm.

Figure 9:
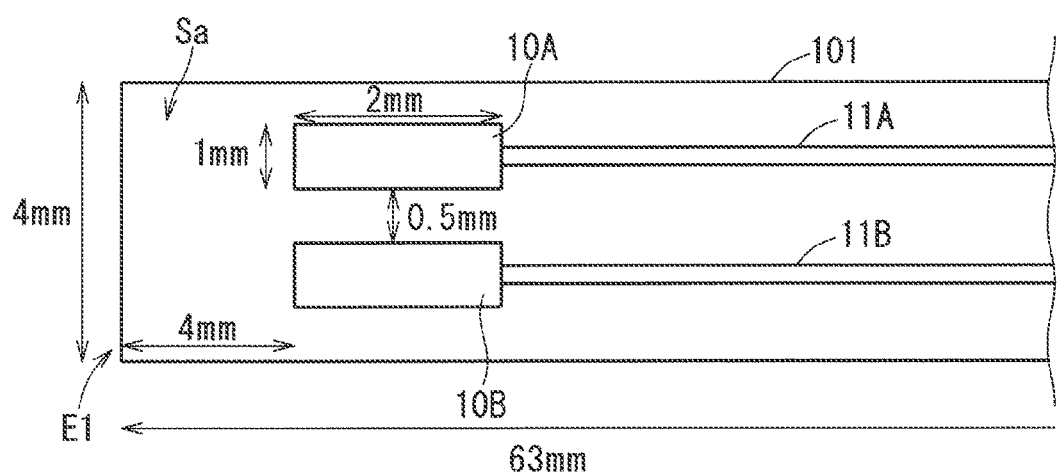
FIG. 9 is a plan view of a sensor element 101 having parallel electrode disposition.

The arrangement of the electrode in the gas sensors were varied in three types. Specifically, the gas sensors were prepared in any of a type (hereinafter referred to as "1st.→2nd." type) in which the first sensing electrode 10A is closer to the leading end part E1 than the second sensing electrode 10B as in the gas sensor 100A according to the first aspect, a type (hereinafter referred to as "2nd.→1st." type) in which the second sensing electrode 10B is closer to the leading end part E1 than the first sensing electrode 10A as in the gas sensor 100B according to the second aspect, and a type (hereinafter referred to as parallel type) in which the first sensing electrode 10A and the second sensing electrode 10B are provided in parallel to each other in the element longitudinal direction and symmetric with respect to the element longitudinal direction. FIG. 9 is a plan view of a sensor element 101 having the parallel electrode disposition. The sizes of the first sensing electrode 10A and the second sensing electrode 10B were same as those of the "1st.→2nd." type and the "2nd.→1st." type but with only different orientations. The sizes of the other parts were same as those of the "first→second" type and the "second→first" type.

The protective cover was varied in two types of the leading-end-inflow type and the side-surface-inflow type.

Gas Sensor No. 3 corresponds to the gas sensor 100A according to the first aspect, and Gas Sensor No. 5 corresponds to the gas sensor 100B according to the second aspect.

Gas Sensor No. 2 was the gas sensor 100A in which the protective cover type was unchanged but only the electrode disposition type was changed to the "2nd/→1st." type, and Gas Sensor No. 6 was the gas sensor 100B in which the protective cover type was unchanged but only the electrode disposition type was changed to the "1st.→2nd." type. In Gas Sensors No. 2 and No. 6, the second sensing electrode 10B contacts the measurement gas earlier than the first sensing electrode 10A.

In Gas Sensors No. 1 and No. 4, the first sensing electrode 10A and the second sensing electrode 10B were equivalent to the flow of the measurement gas.

Then, the response times of the first sensing electrode 10A and the second sensing electrode 10B were measured for each gas sensor thus obtained in accordance with the above-described response time measurement condition, and the response time difference was calculated. The quality of the responsivity of each gas sensor was determined based on the result.

Figure 10A:
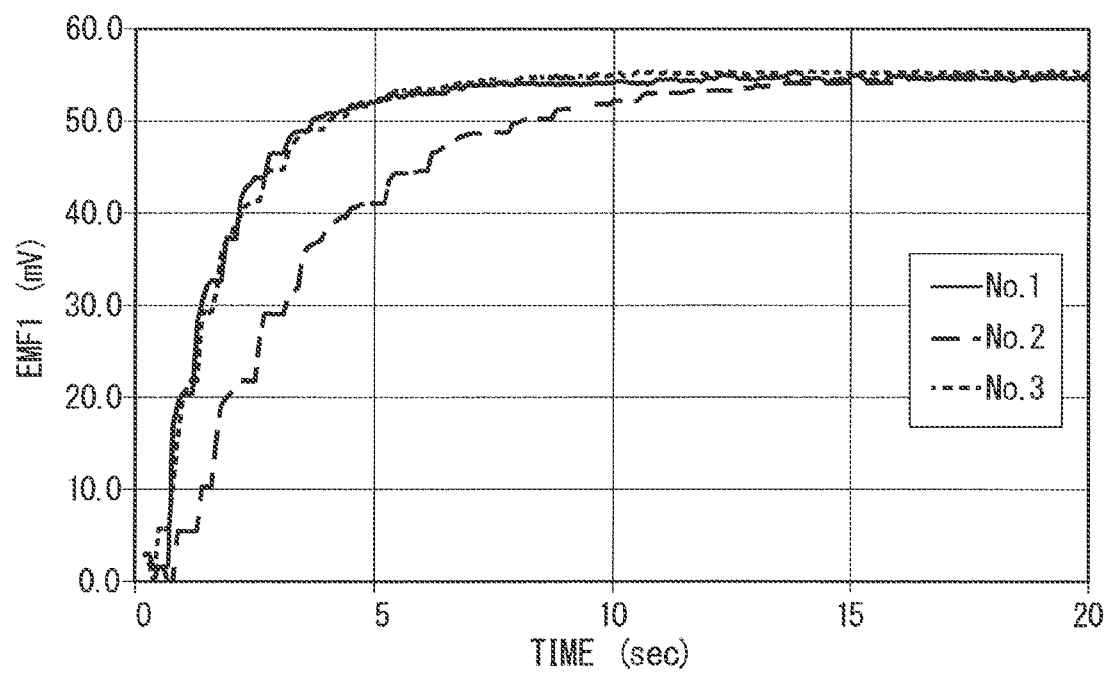
FIGS. 10A and 10B are diagrams exemplarily illustrating a response measurement profile of the first sensing electrode 10A.
Figure 10B:
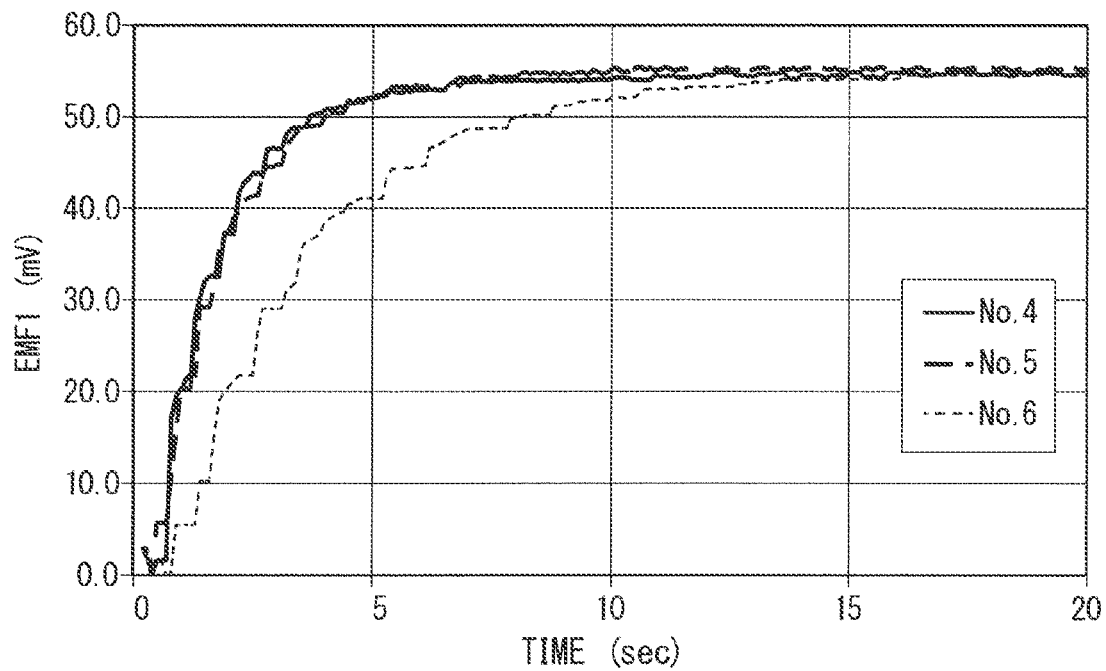

FIGS. 10A and 10B are diagrams exemplarily illustrating the response measurement profile of the first sensing electrode 10A for the six kinds of gas sensors. FIG. 10A illustrates the response measurement profile for Gas Sensors No. 1 to No. 3, and FIG. 10B illustrates the response measurement profile for Gas Sensors No. 4 to No. 6. FIGS. 11A and 11B are diagrams exemplarily illustrating the response measurement profile of the second sensing electrode 10B for the six kinds of gas sensors. FIG. 11A illustrates the response measurement profile for Gas Sensors No. 1 to No. 3, and FIG. 11B illustrates the response measurement profile for Gas Sensors No. 4 to No. 6. Table 1 lists, for each of the six kinds of gas sensors, the electrode arrangement type, the protective cover disposition type, the response times of the first sensing electrode 10A and the second sensing electrode 10B calculated from the response measurement profile, the response time difference as the difference value between the response times, and a result of the quality determination of the responsivity of the gas sensor based on the value.

TABLE 1

| No. | Electrode Arrangement Type | Protective Cover Type | First Sensing Electrode Response Time (sec) | Second Sensing Electrode Response Time (sec) | Response Time Difference (sec) | Quality Determination |
|---|---|---|---|---|---|---|
| 1 | Parallel | Leading-End-Inflow | 2.9 | 1.1 | 1.8 | Δ |
| 2 | 2nd.→1st. | Leading-End-Inflow | 6.5 | 1.1 | 5.4 | X |
| 3 | 1st.→2nd. | Leading-End-Inflow | 3.5 | 3.5 | 0.0 | ○ |
| 4 | Parallel | Side-Surface-Inflow | 2.9 | 1.1 | 1.8 | Δ |
| 5 | 2nd.→1st. | Side-Surface-Inflow | 3.5 | 3.5 | 0.0 | ○ |
| 6 | 1st.→2nd. | Side-Surface-Inflow | 6.5 | 3.3 | 3.2 | X |

The quality determination of the responsivity of the gas sensor was performed based on the following criteria.

"Extremely excellent responsivity" (circles in Table 1): The response time difference is 1 second or shorter;

"Excellent responsivity" (triangles in Table 1): The response time difference is longer than 1 second and equal to or shorter than 2 seconds;

"Less excellent responsivity" (crosses in Table 1): Cases other than the above-described 2 two cases.

As indicated in Table 1, it has been confirmed that the excellent responsivity was achieved in Gas Sensors No. 1 and No. 3 to No. 5, and particularly, the extremely excellent responsivity with the response time difference of zero seconds was achieved in Gas Sensors No. 3 and No. 5. In Gas Sensors No. 2 and No. 6, the response time difference between the two electrodes was significant.

Accordingly, to perform measurement with the excellent responsivity without $O_2$ interference, it is preferable that the first sensing electrode 10A and the second sensing electrode 10B are disposed so that the first sensing electrode 10A contacts the measurement gas earlier than the second sensing electrode 10B as in the above-described preferred embodiment.

While the invention has been shown and described in detail, the foregoing description is in all aspects illustrative and not restrictive. It is therefore understood that numerous modifications and variations can be devised without departing from the scope of the invention.

What is claimed is:

1. A mixed-potential gas sensor configured to sense a sensing target gas component contained in measurement gas and identify a concentration of the sensing target gas component, the gas sensor comprising:
    a sensor element made of an oxygen-ion conductive solid electrolyte, the sensor element having a leading end part which contacts the measurement gas and a base end part at an opposite end from the leading end part and does not contact the measurement gas;
    a first sensing electrode as a cermet electrode provided on a surface of said sensor element on one side of the leading end part and containing a Pt—Au alloy;
    a second sensing electrode as a cermet electrode provided on the surface of said sensor element on said one side of the leading end part and containing Pt;
    a reference electrode provided inside said sensor element to be made contact with air;
    an electrode protective layer as a porous layer covering said first and second sensing electrodes;
    a housing inside which said sensor element is fixed;
    a protective cover that is attached to said housing and surrounds said one leading end part of said sensor element and into which measurement gas flows; and
    a controller and an electronic control unit (ECU) configured to identify the concentration of said sensing target gas component in said measurement gas, said controller being configured to acquire, while said gas sensor is disposed in said measurement gas, a first sensor output as a potential difference occurring between said first sensing electrode and said reference electrode in accordance with the concentration of said sensing target gas component and a concentration of oxygen, and a second sensor output as a potential difference occurring between said second sensing electrode and said reference electrode in accordance with the concentration of oxygen, and provide the first and second sensor outputs to the ECU, and the ECU being configured to identify the concentration of said sensing target gas component in said measurement gas based on said first and second sensor outputs,
    wherein said first sensing electrode and said second sensing electrode are disposed on the surface of said sensor element on said one side of the leading end part so that said measurement gas flowing into said protective cover reaches said first sensing electrode earlier than said second sensing electrode.

2. The gas sensor according to claim 1, wherein said protective cover is formed so that said measurement gas flows into said protective cover from said one side of the leading end part of said sensor element positioned inside said protective cover, and
    said first sensing electrode is provided closer to said one leading end part than said second sensing electrode in said sensor element.

3. The gas sensor according to claim 2, wherein said first and second sensing electrodes are separated from each other at an interval equal or more than 0.3 mm and equal to or less than 0.5 mm in a longitudinal direction of said sensor element.

4. The gas sensor according to claim 1, wherein said protective cover is formed so that said measurement gas flows into said protective cover from a side of said sensor element positioned inside said protective cover, and
    said first sensing electrode is provided closer to an inflow position of said measurement gas flows into said protective cover than said second sensing electrode in said sensor element.

5. The gas sensor according to claim 4, wherein said first and second sensing electrodes are separated from each other at an interval equal or more than 0.3 mm and equal to or less than 0.5 mm in a longitudinal direction of said sensor element.

6. The gas sensor according to claim 1, wherein said first and second sensing electrodes are separated from each other at an interval equal or more than 0.3 mm and equal to or less than 0.5 mm in a longitudinal direction of said sensor element.

* * * * *